United States Patent
Sanchez

(10) Patent No.: US 11,986,981 B2
(45) Date of Patent: May 21, 2024

(54) SILICONE CONTAINER HAVING A METAL WIRE REINFORCED RIM AND METHOD FOR FORMING

(71) Applicant: Andres Sanchez, Escondido, CA (US)

(72) Inventor: Andres Sanchez, Escondido, CA (US)

( * ) Notice: Subject to any disclaimer, the term of this patent is extended or adjusted under 35 U.S.C. 154(b) by 0 days.

(21) Appl. No.: 17/542,173

(22) Filed: Dec. 3, 2021

(65) Prior Publication Data

US 2023/0173719 A1 Jun. 8, 2023

(51) Int. Cl.
*B29C 43/18* (2006.01)
*B29C 43/00* (2006.01)
*B29C 43/14* (2006.01)
*B29C 43/52* (2006.01)
B29K 83/00 (2006.01)
B29K 305/00 (2006.01)
B29L 31/00 (2006.01)

(52) U.S. Cl.
CPC ............ *B29C 43/18* (2013.01); *B29C 43/003* (2013.01); *B29C 43/14* (2013.01); *B29C 43/52* (2013.01); *B29C 2043/182* (2013.01); *B29K 2083/00* (2013.01); *B29K 2305/00* (2013.01); *B29L 2031/7132* (2013.01)

(58) Field of Classification Search
None
See application file for complete search history.

(56) References Cited

FOREIGN PATENT DOCUMENTS

WO    WO-2022047880 A1 * 3/2022 ............. A21B 3/136

OTHER PUBLICATIONS

Machine translation of WO-2022047880-A1 (Year: 2022).*

* cited by examiner

*Primary Examiner* — Robert J Grun
(74) *Attorney, Agent, or Firm* — John R. Ross; John R. Ross, III

(57) ABSTRACT

A method for forming a silicone container having a reinforced rim. A layer of adhesive is applied to the outer surface of a metal ring. The adhesive layer is covered with a first plug of unvulcanized silicone. The first plug of unvulcanized silicone is then vulcanized to form a vulcanized silicone covered metal ring. The vulcanized silicone covered metal ring is then inserted into a mold along with a second plug of unvulcanized silicone. The second plug of unvulcanized silicone is then vulcanized so that it binds with the vulcanized silicone covered metal ring to form a silicone container having a reinforced rim. In one preferred embodiment the silicone container having a reinforced rim is a bowl. In another preferred embodiment the silicone container having a reinforced rim is a cup.

4 Claims, 3 Drawing Sheets

SILICONE CONTAINER HAVING A METAL WIRE REINFORCED RIM AND METHOD FOR FORMING

The present invention relates to silicone devices, and in particular to silicone containers.

BACKGROUND OF THE INVENTION

Silicone containers are known in the prior art. Currently, there are many silicone bowls and cups available for purchase in the marketplace. Prior art silicone bowls and cups are durable, safe and easy to use and easy to clean. Parents in particular, appreciate the safety aspects of silicone containers for their young children.

However, despite the many positive aspects of silicone cups and bowls, there are some aspects that need improvement. For example, silicone is flexible. Therefore, as the size of the bowl or cup increases, so increases the flexibility of the container. A floppy bowl or cup can be harder to grip and may lead to inadvertent spillage.

What is needed is silicone container that has a reinforced rim for increased stability and rigidity.

SUMMARY OF THE INVENTION

The present invention provides a method for forming a silicone container having a reinforced rim. A layer of adhesive is applied to the outer surface of a metal ring. The adhesive layer is covered with a first plug of unvulcanized silicone. The first plug of unvulcanized silicone is then vulcanized to form a vulcanized silicone covered metal ring. The vulcanized silicone covered metal ring is then inserted into a mold along with a second plug of unvulcanized silicone. The second plug of unvulcanized silicone is then vulcanized so that it binds with the vulcanized silicone covered metal ring to form a silicone container having a reinforced rim. In one preferred embodiment the silicone container having a reinforced rim is a bowl. In another preferred embodiment the silicone container having a reinforced rim is a cup.

DETAILED DESCRIPTION OF THE PREFERRED EMBODIMENTS

Figure 1:
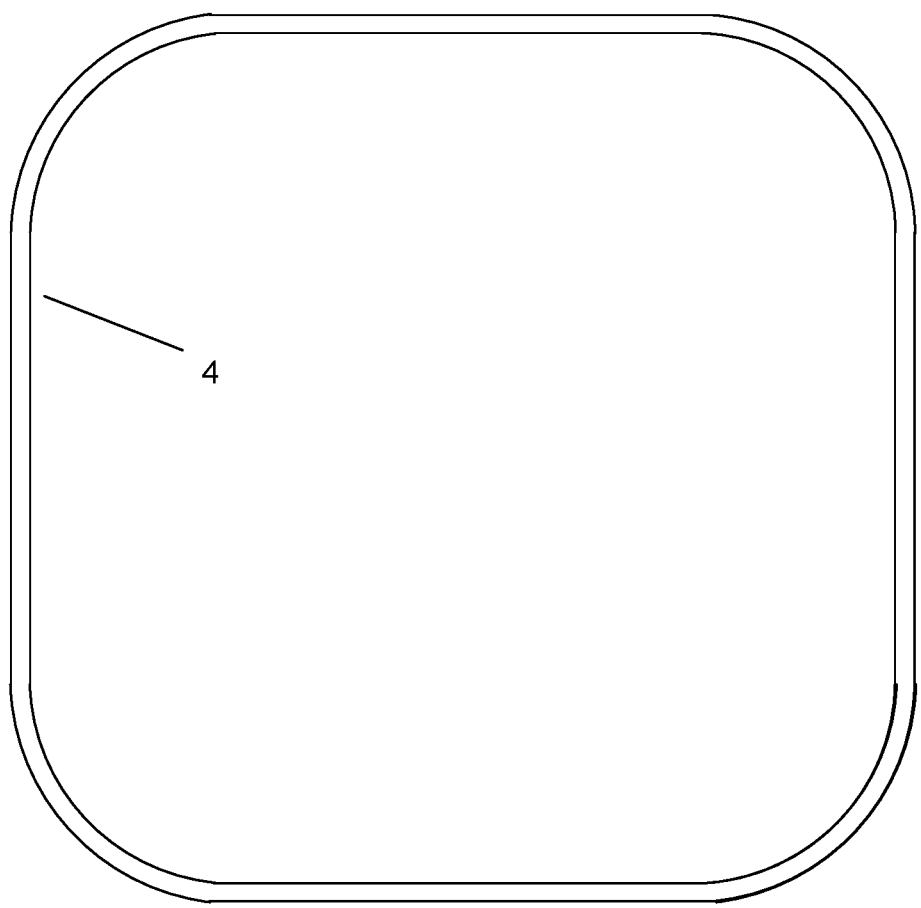
FIGS. 1 and 2 show a preferred metal wire.
Figure 2:
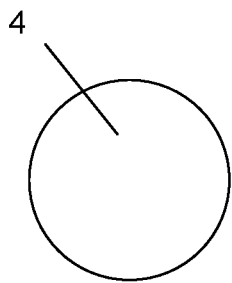

In FIG. 1 circular metal wire 4 has been formed into the rectangular shape shown having rounded corners 3. A circular cross section view of wire 4 is shown in FIG. 2. In a preferred embodiment, metal wire 4 has a diameter of approximately ⅛ inch.

Figure 3:
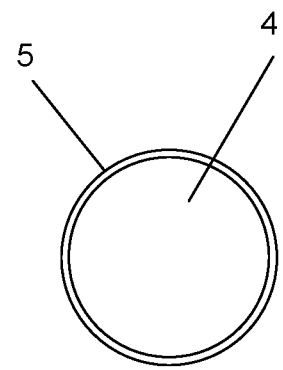
FIG. 3 shows the metal wire covered in an adhesive layer.

In FIG. 3, the user has applied liquid adhesive layer 5 to the surface of wire 4. A variety of adhesive types may be used. In one embodiment, a preferred adhesive is an industrial strength silicone adhesive manufactured by Donnguan Rubber and Plastic Co (model no. MW-109-5b), based out of China. Adhesive layer 5 is preferably applied with a brush. Adhesive layer 5 functions to keep wire 4 properly suspended within the silicone during the compression molding process.

In a preferred embodiment compression molding is used to apply a silicone layer to wire 4. The user places unvulcanized silicone material (also known as a silicone slug) is into the cavity of one of the mold plates of a two-plate compression mold. In a preferred embodiment, color has been added to the silicone slug. Wire 4 is also placed into the mold plate cavity along with the raw silicone material. The mold is then assembled and placed into a heated compression molding press and cycled during which time heat and pressure are applied causing the silicone plug to melt and allowing the melted silicone to spread throughout the mold cavity and cure. Adhesive layer 5 functions to keep wire 4 properly suspended within the silicone as the silicone is melted. For example, adhesive layer 5 prevents wire 4 from sinking or moving through the silicone as it is melted and being cured during the compression molding process. The silicone is vulcanized through this process and silicone covered ring 11 is formed. Pressure is released from the press. The press is opened and the compression mold is removed. The plates are separated using hand tools and silicone covered ring 11 is removed.

Figure 4:
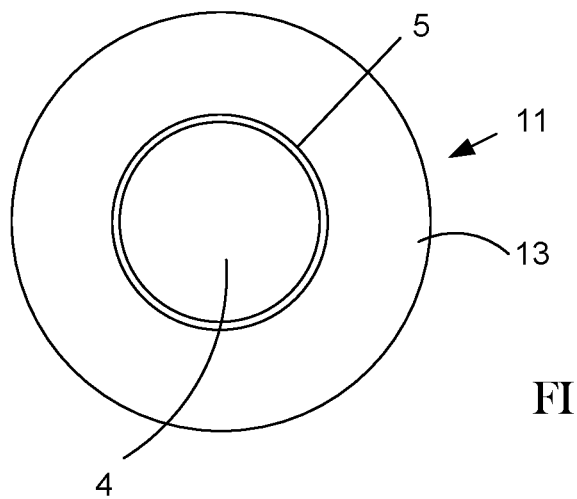
FIGS. 4 and 5 show the metal wire covered in vulcanized silicone.
Figure 5:
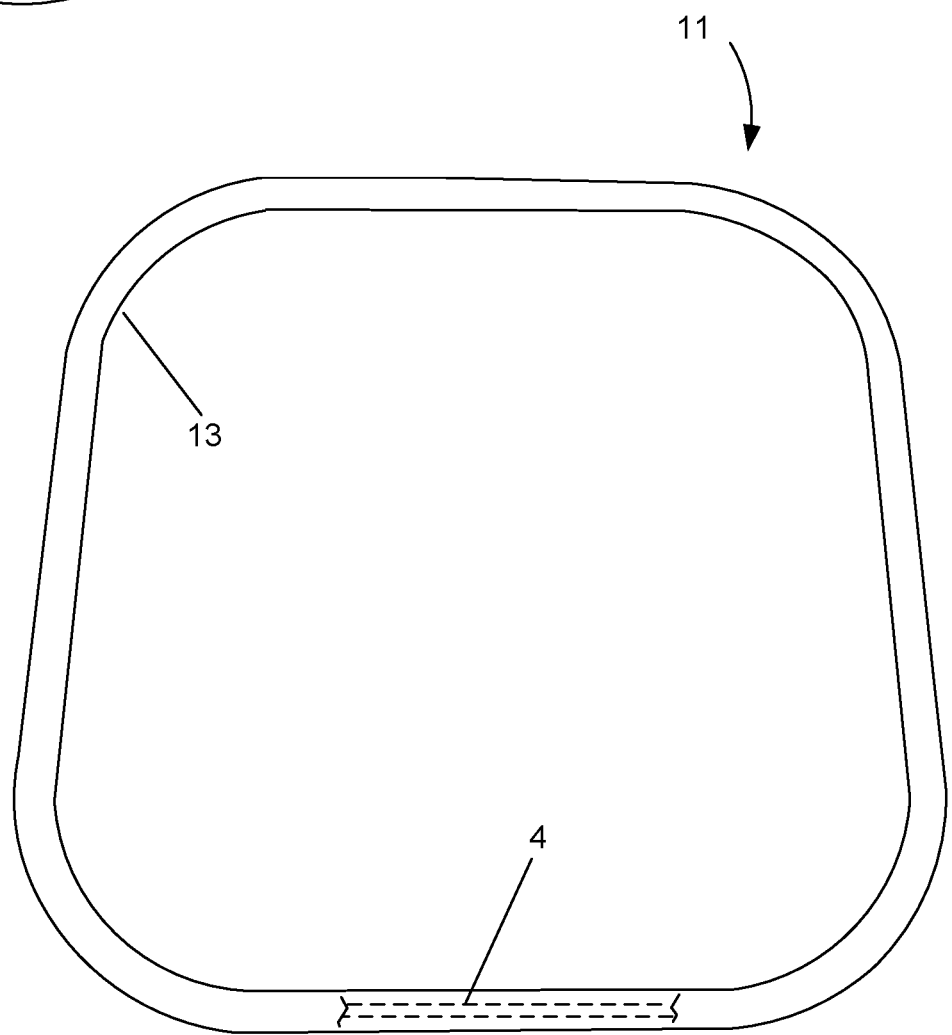

FIGS. 4 and 5 show silicone coated ring 11. Silicone coated ring 11 includes metal wire 4 with adhesive layer 5 surrounded by vulcanized silicone layer 13. Metal wire 4 is properly centered within silicone layer 13.

Figure 6:
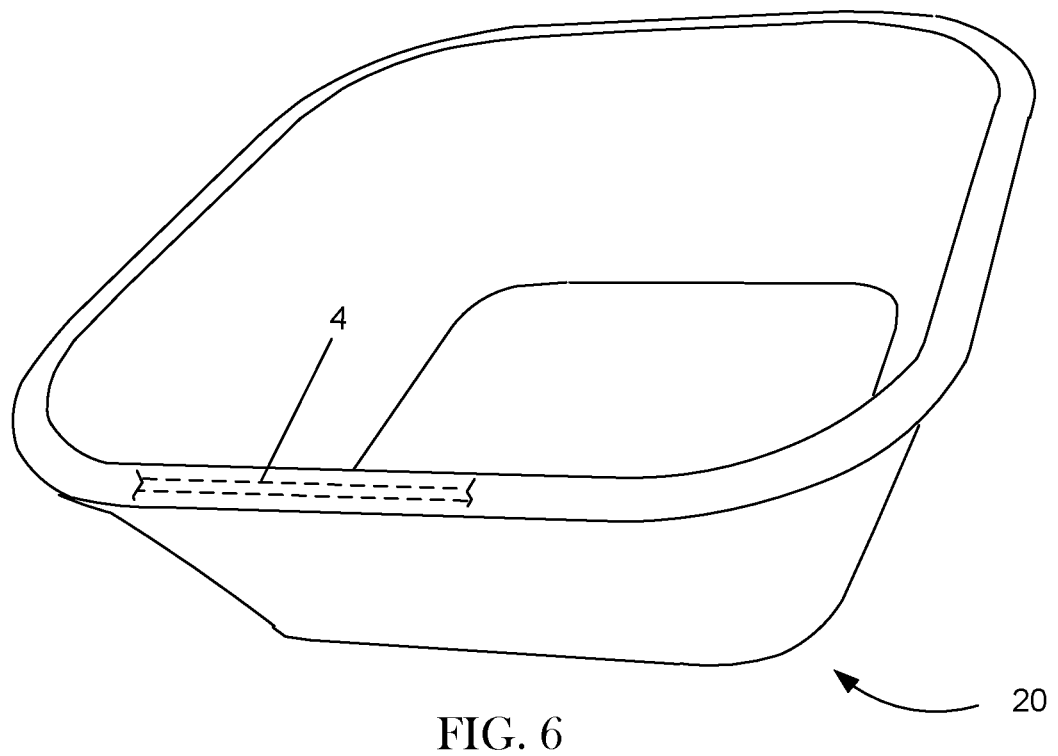
FIGS. 6 and 7 show a preferred silicone bowl having a reinforced rim.
Figure 7:
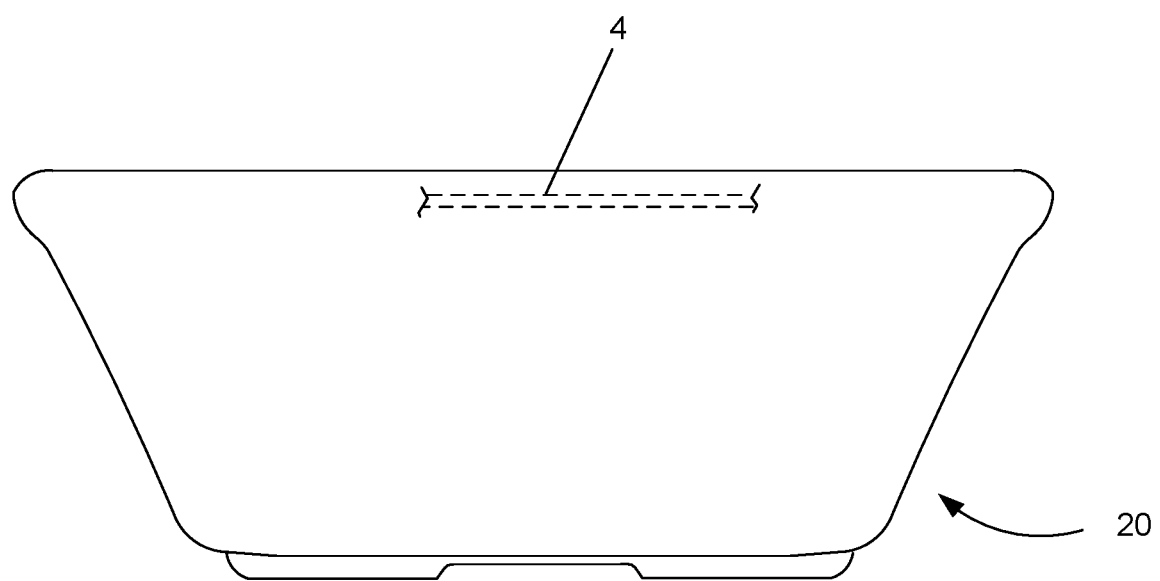

In a preferred embodiment compression molding is used to form silicone bowl 20 having a rim reinforced by wire 4 (FIGS. 6 and 7). The user places an unvulcanized silicone slug into the cavity of one of the mold plates for the bowl. In a preferred embodiment, color has been added to the silicone slug. Silicone coated ring 11 (created earlier as described) having reinforcement metal wire 4 is also placed into the mold plate cavity along with the raw unvulcanized silicone material. The mold is then assembled and placed into a heated compression molding press and cycled during which time heat and pressure are applied causing the unvulcanized silicone to melt and spread throughout the mold cavity and cure. During the compression molding process the unvulcanized silicone plug becomes vulcanized and binds with silicone coated ring 11 and bowl 20 is formed. Pressure is released from the press. The press is opened and the compression mold is removed. The plates are separated using hand tools and bowl 20 is removed.

Although the above-preferred embodiments have been described with specificity, persons skilled in this art will recognize that many changes to the specific embodiments disclosed above could be made without departing from the spirit of the invention. Therefore, the attached claims and their legal equivalents should determine the scope of the invention.

What is claimed is:
1. A method for encapsulating a metal reinforcement ring into a silicone container to give the silicone container a reinforced rim, said method comprising the steps of:
   A. obtaining a metal ring, said metal ring comprising an outer surface,
   B. applying a layer of adhesive to said outer surface of said metal ring,
   C. covering said adhesive layer with a first plug of unvulcanized silicone,
   D. vulcanizing said first plug of vulcanized silicone to form a vulcanized silicone covered metal ring,

E. inserting said vulcanized silicone covered metal ring into a mold with a second plug of unvulcanized silicone, and F. vulcanizing said second plug of unvulcanized silicone so that it binds with said silicone covered metal ring to form a silicone container having a reinforced rim.

2. The method as in claim 1, wherein said silicone container is a silicone bowl.

3. The method as in claim 1, wherein said silicone container is a silicone cup.

4. The method as in claim 1, wherein said first plug of unvulcanized silicone and said second plug of unvulcanized silicone are vulcanized due to heat and pressure supplied during a compression molding process.

\* \* \* \* \*